United States Patent [19]

Roen

[11] 4,295,031

[45] * Oct. 13, 1981

[54] ARC WELDING APPARATUS WITH OSCILLATING ELECTRODE

[75] Inventor: Richard A. Roen, Edmonton, Canada

[73] Assignee: The Research Council of Alberta, Edmonton, Canada

[ * ] Notice: The portion of the term of this patent subsequent to Dec. 4, 1996, has been disclaimed.

[21] Appl. No.: 56,294

[22] Filed: Jul. 10, 1979

Related U.S. Application Data

[63] Continuation of Ser. No. 895,266, Apr. 10, 1978, Pat. No. 4,177,373.

[30] Foreign Application Priority Data

Aug. 3, 1977 [GB] United Kingdom ............... 32626/77

[51] Int. Cl.³ ............................................... B23K 9/12
[52] U.S. Cl. ............................ 219/125.12; 219/60 A; 219/137.7

[58] Field of Search ............. 219/125.1, 125.12, 60 A, 219/60 R, 137.7; 228/27

[56] References Cited

U.S. PATENT DOCUMENTS 2,405,761 8/1946 Simmie .............................. 219/137.7

Primary Examiner—E. A. Goldberg
Attorney, Agent, or Firm—Sim & McBurney

[57] ABSTRACT

A welding process, such as a GMA welding process, employs a consumable electrode with the consumable electrode being oscillated back and forth over the surface of an object to which welding material is to be applied or across the gap between two pieces of metal to be welded together. At the ends of the swings of the consumable electrode an impact force is applied to the consumable electrode to interrupt its movement, thereby causing molten metal at the end of the consumable electrode from which the arc is struck to be impelled therefrom.

4 Claims, 10 Drawing Figures

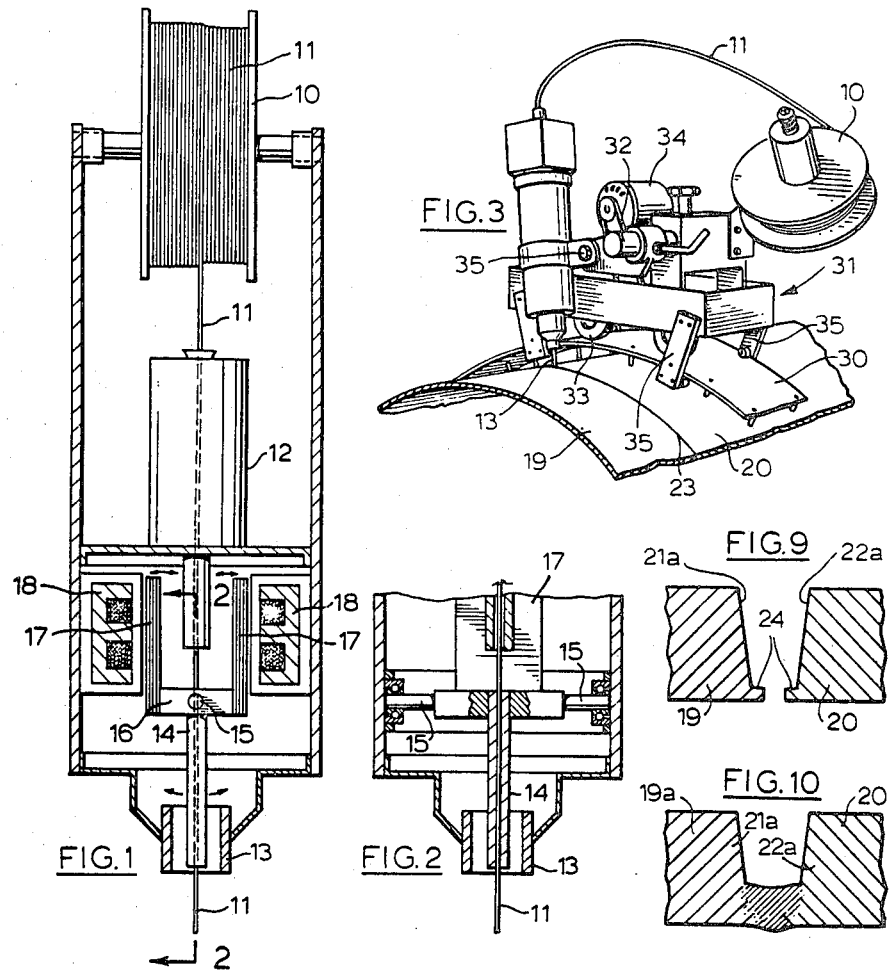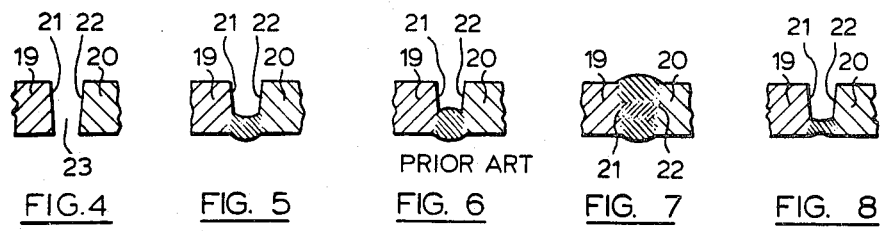

ARC WELDING APPARATUS WITH OSCILLATING ELECTRODE

This application is a continuation of application Ser. No. 895,266, filed Apr. 10, 1978, now U.S. Pat. No. 4,177,373.

BACKGROUND OF THE INVENTION

This invention relates to welding processes and apparatus that can be described generically as consumable electrode arc welding processes and apparatus. Specific examples of welding techniques that can be employed in practising this invention are GMA (gas metal arc) welding, submerged arc welding and flux cored electrode welding.

The instant invention is particularly useful in the welding of pipelines, but its applications are by no means limited thereto. However, by way of example, the instant invention will be described herein in detail as it applies to pipeline welding, but this is not to be taken as limiting.

In the welding of pipelines several different techniques using automatic welding equipment have been tried. Thus, the CRC process is a GMA welding process requiring special joint preparation including the formation of a chamfer on the inside edges of the pipe sections to be joined. In this process the root pass is accomplished internally by welding torches that are located inside the pipe sections.

In the "ESSO" (trade mark) process the pipe sections to be joined are butted together and a saw blade that immediately precedes the welding torch cuts a 0.060" gap at the butt joint. A 0.040" consumable electrode is inserted into this gap. This electrode must be kept directly in the centre of the gap if consistent results are to be obtained. In practice this centering has been found to be so difficult to maintain that the "ESSO" process essentially is not used commercially.

Although it is not used extensively in pipeline welding, the TIG (tungsten inert gas) welding process is used extensively in areospace and nuclear welding, another application to which the instant invention may be applied. In the TIG process an arc is struck between a tungsten electrode and the base material being welded. The base material melts and a filler rod is fed into the pool of molten metal and itself melts. The TIG process is a relatively slow process (2" to 12" of weld per minute).

The other technique commonly employed in welding pipelines is conventional welding using flux coated stick electrodes. Those skilled in the art are well aware that there are many problems inherent in stick electrode welding.

During the GMA welding operation both large and small drops of metal melt off the welding electrode at random times. The occurrence of a large drop may interfere with the arc stability and thus a small defect may be created. When the arc is unstable it often causes one side of the article (base material) being welded to become hotter than the other, and it is generally accepted that poor heat distribution results in poor strength characteristic of the completed weldment.

An important factor in welding is the penetration that is obtained. Penetration is a function of heat input, and if the arc is not stable, it is necessary to slow down the welding operation to achieve the required penetration. Because of this welders commonly slow down the travel speed and consequently put into the base material more heat than is required. Putting more heat than is required into the base material is undesirable, however, since it degrades the metallurgical physical properties of the base material.

SUMMARY OF THE INVENTION

In accordance with this invention it has been discovered that many of the problems and disadvantages of prior art welding techniques can be overcome by oscillating or vibrating the consumable electrode in the gap between the sections being welded and causing the welding torch (or a component thereof associated with the electrode) to impact against stops at both limits of its travel, thereby causing molten metal from the consumable electrode to be impelled against the sidewalls defining the gap.

It should be understood, however, that even though the following detailed description is in respect of a process where a weld is made in a gap, the invention is not so restricted. The process could be used, for example, in hard surfacing where the scraper blade of a bulldozer or the teeth of a power shovel, for example, have welding material deposited on the surface of the blade or tooth that digs into the ground. The process also could be used for sealing the fuel rod to the tube sheet of a nuclear reactor. In these cases the consumable electrode simply is vibrated over the surface or over the gap to be sealed and is caused to impact against stops at both limits of its travel.

The process is advantageous in the aforementioned nuclear reactor application because the resulting weld will be spread out on the weldment surface and the penetration will not be excessively deep. Shallow penetration is desirable in this particular application because heat distortion and base material dilution must be avoided.

The process is advantageous for hard surfacing, again because of the relatively shallow penetration that will result. Thus, when the instant process is employed for hard surfacing, the hard surface of the blade or tooth will be composed primarily of hard weld material rather than primarily of an alloy of the base material and welding material, as would be the case where hard surfacing was achieved using a conventional MIG welding process.

In accordance with one aspect of this invention there is provided arc welding apparatus for use with a consumable electrode to form a weld between metal surfaces separated by a gap comprising, in combination, a welding torch, means for moving a consumable electrode through said torch and into said gap, means for moving the tip of said electrode along a predetermined path longitudinally of said gap, means for oscillating said electrode back and forth across said predetermined path, and means for applying an impact force to said electrode at the end of each half cycle of oscillation of said electrode to interrupt its movement and impel molten metal onto the one of the surfaces towards which said electrode was moving before impact, said welding torch including pivotably mounted electrode guide means for said electrode, said electrode passing through and contacting said guide means, said means for oscillating said electrode back and forth across said predetermined path including means for moving said electrode guide means, said means for moving said electrode guide means including electromagnetic means and armature means operably associated therewith and adapted to be magnetically attracted to said electromagnetic means when said electromagnetic means are energized, one of said electromagnetic means and said armature means being operably associated with said guide means, and means for energizing said electromagnetic means.

The instant invention is not to be confused with the known technique, in manual or GMA welding, of slowly moving the stick electrode back and forth in the gap so as to fill the gap. The frequency of this operation is much lower than the frequency desired in the practice of the instant invention, and no impacting is involved.

The aforementioned manual movement of the stick electrode has been automated, as is evident, for example, from U.S. Pat. No. 1,667,585 issued Apr. 24, 1928, V. J. Chapman, but the automated versions, like the manual version, are at low frequency and are devoid of impacting. In all cases the back and forth movement achieved in the prior art has been simply to fill the gap, whereas in the instant invention vibration and impacting are employed to achieve a unique weld with deposition of metal on the joint sidewalls and coalescence slightly behind.

BRIEF DESCRIPTION OF THE DRAWINGS

This invention will become more apparent from the following detailed description taken in conjunction with the appended drawings, in which:

FIG. 1 is a front elevation, in schematic form, of a welding torch that may be used in practising this invention;

FIG. 2 is a section taken along line 2—2 in FIG. 1;

FIG. 3 shows a pipeline being welded using a torch embodying this invention;

FIGS. 4 and 9 show two sections that are to be welded together; and

FIGS. 5–8 and 10 show various types of welds, FIG. 6 being a prior art weld.

DETAILED DESCRIPTION OF THE INVENTION INCLUDING THE PREFERRED EMBODIMENT

Referring to FIG. 1, there is shown schematically a welding torch that can be used in the practice of this invention. The torch includes a rotatable reel 10 of electrode wire 11 that is fed via an electric drive motor 12 through the torch and which emerges through the contact tip 13 of the torch. As is conventional in MIG welding, although not shown in the Figure, provision is made for supplying an inert gas mixture to the torch, the gas mixture flowing out of the gas cup of the torch around electrode wire 11 and serving to enhance the arc and prevent oxidation from taking place in the weld area. Means (not shown) are provided for controlling the speed of motor 12 so as to vary the speed of the electrode wire emerging from contact tip 13.

The welding torch as just described is essentially conventional in nature. It is modified, however, by arranging the electrically conductive tube 14 which guides electrode wire 11 between motor 12 and tip 13 so that it pivots about a horizontal axis rather than being stationary. The pivot pins for tube 14 are shown at 15 (FIG. 2).

Mounted on a bracket 16 fastened to tube 14 are two fingers 17 made of iron. Located to one side of each finger 17 are electromagnets 18 that are supplied with essentially square wave pulses of voltage from a suitable power source (not shown), the output signal frequency of which is variable. When energized, electromagnets 18 attract the adjacent fingers 17 causing tube 14 and electrode wire 11 to vibrate back and forth, as shown by the double-headed arrows, at a frequency determined by the frequency of the output signal of the power source.

Fingers 17 are arranged so that they impact against their associated electromagnets, this impacting having been found to be important in achieving the desired results.

If desired, motor 12 may be secured to fingers 17 and also may oscillate providing greater momentum and a more forceful impact.

Referring now to FIG. 4, there are shown two sections 19 and 20 to be welded together. These two sections may be considered to be parts of two pipe sections. The sidewalls 21 and 22 of the two pipe sections each are bevelled at 6° to the vertical and are separated from each other by 0.125" at the point where they are spaced closest together. The aforementioned angles and spacing are not critical but have been found to provide good results where the sections to be joined are ½" thick. As opposed to the "ESSO" process, it is significant that in practising the instant invention minimum spacings between the two sections shown in FIG. 4 have been varied from 0.060" to 0.160" with quite acceptable welds being obtained, provided that the amplitude of vibration of electrode wire 11 is appropriately adjusted, of course. In the interest of uniformity it is desired that the spacing between the two sections be the same at all points around the pipe sections. It is a feature of the instant invention, however, that considerable variations in the spacing can be tolerated, unlike the "ESSO" process.

While a joint prepared as shown in FIG. 4 may be used in the practice of this invention, the preferred joint is shown in FIG. 9. In this joint sidewalls 21a and 22a (½" in thickness) are inclined at 7° to be vertical, projections 24 each are 0.030" deep and extend outwardly from their associated sidewalls by 0.030" and the spacing between the facing ends of projections 24 is 0.050". However, successful welds have been accomplished with spacings as small as 0.030" using electrode wire of 0.9 mm. and with spacings as high as 0.125". With larger spacings "suck back" may occur, however. If the spacing is increased or decreased, the amplitude of the oscillations and the wire speed likewise will have to be increased and decreased respectively.

In practising the instant invention the torch either is mounted on equipment that moves the torch around the pipe sections, or the torch is held stationary and the pipe is rotated. In the embodiment of the invention shown in FIG. 2, a pipe band 30 that constitutes the track for a carriage 31 or "bug" is clamped to one of the pipe sections a uniform distance away from the gap 23 between the pipe sections. The two pipe sections 19 and 20 are held in end-to-end alignment and in closely spaced relationship by means of an internal clamp (not shown) that is of conventional design and pneumatically operated.

Carriage 31 supports reel 10 and the welding torch, the latter being pivotably mounted on a horizontal shaft 32 to which it is capable of being fastened.

Carriage 31 has wheels 33 that roll over track 30 and that are driven by an electric motor 34 via chains (not shown) and sprockets (not shown). Carriage 31 also has four legs 35 provided with rollers that engage the top, bottom and sides of pipe band 30 to hold carriage 31 on the pipe band. Carriages and pipe bands of the type shown are known in the art.

It will be noted that adjusting bolt 35 permits the angle of the torch to be varied. It has been found that the longitudinal axis of the torch either should be on a radius of the pipe sections, or the contact tip 13 should lead about 2°-6° in the direction of travel of the torch. A rearward inclination tends to promote blow through.

The electrode wire 11 is inserted into the gap 23 between sidewalls 21 and 22, power is supplied via tube 14 to the electrode wire 11 from a conventional source causing an arc to be struck, the electrode wire 11 is fed at a controlled rate by motor 12 and the torch is moved relative to the pipe sections (or vice versa) along gap 23. While this is taking place, energization of electromagnets 18 causes electrode wire 11 to vibrate back and forth across gap 23. The amplitude of the oscillations of the wire are adjusted so as to avoid having the wire strike sidewalls 21 or 22. However, there is impact between fingers 17 and electromagnets 18. The effect of this has been observed using high speed photography which shows that the molten metal at the end of the electrode wire 11 is thrown off the wire and impelled against sidewalls 21 and 22. At the same time a pool of molten metal is formed between the two sections behind the arc in the lower part of gap 23. The resulting weld has the configuration shown in FIG. 5, whereas prior art techniques tend to produce a root pass weld having the confirguration shown in FIG. 6. The latter configuration is undesirable because of the doming effect. Thus, on the second or hot pass the arc will strike to the point of the root pass weld that is closest to the electrode, namely to the dome, resulting in accentuation of the dome and lack of filling immediately adjacent the sidewalls of the sections 19 and 20. The resulting lack of fusion to the sidewalls is called "wagon tracks" in the art and is undesirable. The result is even more accentuated when one is welding between 3 o'clock and 9 o'clock and is known as "roping".

A weld made in accordance with the instant invention does not have the characteristic dome of a prior art weld. Thus "roping" and the formation of "wagon tracks" on the fill pass are avoided.

On the other hand, with a root pass weld of the type produced by the instant invention there is a tendency for a crack to appear along the centre of the weld as it solidifies. This can be overcome by making the hot pass follow closely behind the root pass before the latter has time to cool and form a crack. In practice, this is achieved by mounting a second torch only several inches behind the torch that makes the root pass. With ½" material, the hot pass will be followed by a third and final pass called the cap pass, the resulting weld being as shown in FIG. 7. While vibration may be employed on the hot and cap passes and on any fill passes therebetween, it has been found not to be necessary. If it is employed, it can be at a lower frequency than the lowest frequency that is acceptable for the root pass.

As an example of the instant invention, a joint was prepared as indicated in FIG. 4 (6° angles and 0.125" spacing) between two steel pipes each having a wall thickness of ½". For the root pass power was supplied to the electrode wire 11 from a Hobart (trade name) Model M400 power supply made by Hobart Bros. Company, Troy, Ohio, U.S.A. 230 amps were supplied at 23 arc volts. The wire was fed at 650" per minute and the linear speed of the torch was 20" per minute. Hobart HB 18 0.035" wire with ½" stick-out (static set) was employed. The inert gas mixture used was 5 cu. ft./hr. of $CO_2$ and 35 cu. ft./hr. of argon. The wire was oscillated at a frequency of 19.4 Hz producing 38.8 impacts per second.

The welding operation was observed using a high speed camera. Pictures were taken at 4000 frames per second. As indicated previously, the vibrating electrode "painted" the sidewalls of the two sections being joined with molten metal, and three different modes of welding could be observed, namely dip transfer, drop transfer and spray transfer, the latter two being predominant. An entirely satisfactory root pass weld of the type shown in FIG. 5 was obtained.

As a matter of interest, while one would expect that the electrode would move simply from one side of the gap to the other, such was not the case in this particular situation. After the electrode did move from one side of the gap to the other, it rebounded then moved towards and away from that one side from three to four times before moving back to the other side where the action was repeated. The additional oscillations super-imposed on the main oscillation were observed to be about one third to one half the amplitude of the main oscillation.

Welding of the root pass was carried out following the procedure set out in the preceding example, but the frequency of vibration of the electrode wire was varied. Under the particular conditions noted in the example, it was not possible to produce a satisfactory weld at a frequency of vibration less than 6 Hz, although this is not to say that under different conditions lower frequencies could not be employed. At low frequencies there is a tendency for the molten metal simply to fall through or be blown out of the gap 23.

Welding of the root pass was carried out following the procedure set out in the preceding example but at higher frequencies of vibration. Entirely suitable welds were produced at 40 Hz. However, at about 114 Hz. it was found that the arc climbed up in the gap leaving a recess at the bottom of the weld, as shown in FIG. 8. Such a notch or recess is objectionable in a pipeline because it will create turbulence in the oil or gas and will result in undesirable physical and metallurgical properties such as stress corrosion. It is also unacceptable in pressure vessels because the notch will create a stress riser where the vessel may fail. This is not to say, however, that under different conditions frequencies of the magnitude indicated or higher could not be employed. Also in applications where the notching effect is not objectionable, high frequencies can be used. Higher frequencies might be employed, for example, in processes where the root pass is performed by internal welding.

The power source used in the preceding example was one that is normally used in standard commercial welding processes and automatic MIG welding and is a high reactance power supply. Power supplies used with automatic welding equipment normally have a much lower reactance. Notwithstanding the fact that the welding operation carried out in the example was automatic, the use of a high reactance type power supply, at least on the root pass, providing a "soft" arc was found to be very desirable. On the fill passes, on the other hand, it was found preferable to use a conventional power supply for automatic welding equipment to provide adequate penetration into the preceding weld pass.

The importance of impact was demonstrated by constructing and operating a welding gun that was oscillated by a rotating cam, the gun being spring biased against the cam. With such an arrangement, no impact took place, and at frequencies in excess of 6 Hz unsatisfactory results were obtained, the weld burning through.

Under conditions set forth in the specific example noted hereinbefore the arc voltage was found to be important in achieving the desired results. Thus, it was found that if the arc voltage was reduced to 21 or below, there was a tendency for the molten metal to blow out of the gap 23, while if it was increased to 25 or above, the tendency was for the arc to climb in the gap 23 and for there to be a lack of penetration. This not to say, however, that an arc voltage of about 23 volts is essential to the instant invention. The arc voltage varies with the wire size, the distance to the workpiece and the type of inert gas mixture employed. It also varies with the degree of electrode stick-out (the length of wire that protrudes from the contact tip), so under different conditions than those described in the example herein, different arc voltages may give the best results. For example, in the submerged arc process a heavier wire would be used and a higher arc voltage would be anticipated.

As far as the inert gas mixture is concerned, for the root and hot passes a mixture of 95% argon (by volume) and 5% $CO_2$ preferably is employed, but wide variations are possible with excellent results still being obtained. Thus ratios of 80/20 have been successfully employed. The use of $CO_2$ alone should be avoided, because this leads to the spray transfer mode never being achieved, with inadequate penetration and lack of fusion resulting. On the other hand, the use of argon alone produces too hot an arc and blow through can result.

On any fill pass and on the cap pass a gas mixture that keeps down the spatter is desired, e.g., argon to $CO_2$ in an 80/20 ratio.

As another example of the instant invention, a joint between steel pipes of ½" thickness was prepared as shown in FIG. 9 and as described hereinbefore in the description of FIG. 9, the spacing between projections 24 being 0.050". For the root pass power was supplied to the electrode wire 11 from a Hobart (trade mark) Model MC500 power supply 230 amps were supplied at 23 arc volts. The wire, Union (trade mark) K5 Ni wire (0.9 mm), was fed at 650" per minute, and the linear speed of the torch was 30" per minute. ½" stick-out (static set) was used. The inert gas mixture was 60 cu. ft./hr. of a 95/5 ratio of argon to $CO_2$. The wire was oscillated at a preferred frequency of 30 Hz producing 60 impacts per second. An entirely satisfactory root pass weld of the type shown in FIG. 10 was obtained.

While a preferred embodiment of this invention has been described herein, those skilled in the art will appreciate that changes and modifications can be made therein without departing from the spirit and scope of this invention as defined in the appended claims.

What is claimed is:

1. Arc welding apparatus for use with a consumable electrode to form a weld between metal surfaces separated by a gap comprising, in combination, a welding torch, means for moving a consumable electrode through said torch and into said gap, means for moving the tip of said electrode along a predetermined path longitudinally of said gap, means for oscillating said electrode back and forth across said predetermined path, and means for applying an impact force to said electrode at the end of each half cycle of oscillation of said electrode to interrupt its movement and impel molten metal onto the one of the surfaces towards which said electrode was moving before impact, said welding torch including pivotably mounted electrode guide means for said electrode, said electrode passing through and contacting said guide means, said means for oscillating said electrode back and forth across said predetermined path including means for moving said electrode guide means, said means for moving said electrode guide means including electromagnetic means and armature means operably associated therewith and adapted to be magnetically attracted to said electromagnetic means when said electromagnetic means are energized, one of said electromagnetic means and said armature means being operably associated with said guide means, and means for energizing said electromagnetic means.

2. A welding torch according to claim 1 wherein said means for applying an impact force to said consumable electrode comprise said electrode guide means and means associated therewith adapted to strike said electromagnetic means, whereby the impact of said means associated with said electrode guide means against said electromagnetic means is transmitted to said electrode guide means and via said electrode guide means to said consumable electrode.

3. A welding torch according to claim 2 wherein said means associated with said guide means adapted to strike said electromagnetic means comprises said armature means, said armature means being operably associated with said electrode guide means.

4. A welding torch according to claim 1 wherein said means for oscillating said consumable electrode oscillates said consumable electrode at a frequency of at least 6 Hz.

* * * * *